US012760881B2

(12) United States Patent
Balbinot

(10) Patent No.: US 12,760,881 B2
(45) Date of Patent: Oct. 13, 2026

(54) STRUCTURAL ARRANGEMENT IN AN ELECTRICAL CONNECTION APPLIED TO A VEHICLE LAMP

(71) Applicant: Mauricio Balbinot, Caxias do Sul (BR)

(72) Inventor: Mauricio Balbinot, Caxias do Sul (BR)

( * ) Notice: Subject to any disclaimer, the term of this patent is extended or adjusted under 35 U.S.C. 154(b) by 0 days.

(21) Appl. No.: 18/994,069

(22) PCT Filed: Jul. 24, 2023

(86) PCT No.: PCT/BR2023/050241
§ 371 (c)(1),
(2) Date: Jan. 14, 2025

(87) PCT Pub. No.: WO2024/044829
PCT Pub. Date: Mar. 7, 2024

(65) Prior Publication Data

US 2026/0029117 A1 Jan. 29, 2026

(30) Foreign Application Priority Data

Sep. 2, 2022 (BR) .......................... 2020220177126

(51) Int. Cl.
*F21V 23/06* (2006.01)
*F21S 41/00* (2018.01)
(Continued)

(52) U.S. Cl.
CPC ......... *F21V 23/06* (2013.01); *H01R 13/5202* (2013.01); *H01R 13/5216* (2013.01);
(Continued)

(58) Field of Classification Search
CPC . F21V 23/06; H01R 13/5202; H01R 13/5216; H01R 13/748
See application file for complete search history.

(56) References Cited

U.S. PATENT DOCUMENTS 6,135,780 A 10/2000 Kelwaski et al.
8,469,719 B2 * 6/2013 Norris ....................... F21V 5/04 362/646

(Continued)

FOREIGN PATENT DOCUMENTS

BR 8901844 A 11/1989
BR 202016022686 U2 5/2018

(Continued)

*Primary Examiner* — Bryon T Gyllstrom
(74) *Attorney, Agent, or Firm* — Pilloff Passino & Cosenza LLP; Rachel Pilloff; Sean Passino

(57) ABSTRACT

A constructive arrangement for electrical connection applied to vehicle headlights, the object of the present utility model, is described. Its objective is to resolve the inconveniences described in the prior art through an electrical connection system for headlights equipped with a connector (40) fixed to the housing (10) arranged in a parallel position, wherein this embodiment allows the connector existing in the vehicle (counterpart) to connect to the headlight (100) quickly and practically, facilitating the installation and maintenance of the product. This new embodiment brings advantages in the application of the product due to improving the means of connection and installation, improving the space and visualization for allocating the connector, in addition to improving the removal of the electrical connector next to the headlight due to the lock being visible and easily accessible.

7 Claims, 17 Drawing Sheets

(51) Int. Cl.
*H01R 13/52* (2006.01)
*H01R 13/74* (2006.01)

(52) U.S. Cl.
CPC ............ *H01R 13/748* (2013.01); *F21S 41/00* (2018.01); *H01R 2201/26* (2013.01)

(56) References Cited

U.S. PATENT DOCUMENTS

| | | | | |
|---|---|---|---|---|
| 8,678,632 | B2 * | 3/2014 | Gallai | F21S 41/192<br>362/546 |
| 9,172,162 | B2 * | 10/2015 | Mostoller | H01R 12/7047 |
| 9,461,426 | B2 | 10/2016 | Armacost et al. | |
| 9,488,356 | B2 | 11/2016 | Gui et al. | |
| 9,509,076 | B2 | 11/2016 | Hashimoto | |
| 10,041,657 | B2 | 8/2018 | Lenz et al. | |
| 10,554,059 | B1 * | 2/2020 | Hemingway | F21V 23/003 |
| 10,907,803 | B2 | 2/2021 | Andersson et al. | |
| 2012/0015537 | A1 * | 1/2012 | Park | H01R 13/521<br>439/271 |
| 2015/0070927 | A1 * | 3/2015 | Kurahashi | B01D 53/26<br>362/546 |
| 2020/0039661 | A1 * | 2/2020 | Ishikiriyama | F21S 41/192 |
| 2021/0215325 | A1 * | 7/2021 | Luo | H01R 13/73 |
| 2022/0026049 | A1 * | 1/2022 | Ninomiya | F21S 8/026 |

FOREIGN PATENT DOCUMENTS

| | | | |
|---|---|---|---|
| CN | 113748297 | A | 12/2021 |
| WO | 2018168033 | A1 | 9/2018 |

* cited by examiner

Cut AA

STRUCTURAL ARRANGEMENT IN AN ELECTRICAL CONNECTION APPLIED TO A VEHICLE LAMP

APPLICATION FIELD OF THE UTILITY MODEL

The present utility model describes a constructive arrangement in electrical connection applied to a vehicle headlight. More specifically, it comprises an electrical connection system for headlights arranged in a parallel position to the electronic board, where this embodiment allows for existing connector in the vehicle (counterpart) to connect to the headlight quickly and practically, facilitating the installation and maintenance of the product. This new embodiment brings advantages in the application of the product due to improving the means of connection and installation, improving the space and visualization for allocating the connector, in addition to improving the removal of the electrical connector next to the headlight due to the lock being visible and easily accessible.

The electrical connector, applied in parallel, allows for its application and arrangement in different shapes, which vary depending on the model of the counterpart, in addition to having a different number of terminals, allowing for electrical connection of headlights with different amounts of functions.

BACKGROUND OF THE UTILITY MODEL

Currently on the market, there are several models and types of headlights intended for vehicle and road implement applications, where they normally have an electrical connection made through a connector perpendicular to the electronic board and headlight housing.

However, the present embodiment does not allow the headlights to have a reduced size, in terms of depth, generating several inconveniences in the means of placing and removing the electrical connector next to the headlight. Furthermore, headlights have mounting restrictions in depth so that the market solution for this inconvenience is to mount a different connector with cable exit at 90°, however these connectors are special, having little availability on the market and a high cost.

Thus, the present inventor, seeking to solve market inconveniences, has developed a new embodiment of a connector applied to a vehicle headlight that allows it to be arranged in parallel to the rear of the headlight, reducing the total height even when the connector is mounted. Furthermore, it allows the use of market standard connectors which are easy to replace.

In search performed on the prior art, we identified several models of headlights, where we can highlight the following documents:

U.S. Pat. No. 9,461,426 (Peterson. 2014) describes an electrical plug-socket assembly with an operable retainer to securely engage and prevent displacement of the plug relative to the socket.

EP2345840 (Grote. 2010) describes an electrical connection device for a lamp housing that allows simple and direct alignment of circuit connector terminals with conductive power connection pads on a lamp circuit board within a lamp housing.

BR8901844 (Aspoeck. 2009) describes a headlight that incorporates an LED integrated circuit board, which will be properly installed in its own receptacle, passing the pins through the headlight body, these being housed within an extension of the integrated LED circuit board terminals are connected to the wires in the vehicle's power supply circuit.

These documents described in the prior art describe vehicle side headlights equipped with embodiments applied to the electrical connection means, however these documents do not describe the same embodiment of a connector fixed and positioned in a parallel position to the electronic board, in order to facilitate the means of connection and reduce the space applied to installation.

In this way, the object of the present utility model is an electrical connection system for headlights arranged in a parallel position to the electronic board, so that this embodiment allows the existing connector in the vehicle (counterpart) to connect to the headlight quickly and practical, facilitating the installation and maintenance of the product. This new embodiment brings advantages in the application of the product due to improving the means of connection and installation, improving the space and visualization for allocating the connector, in addition to improving the removal of the electrical connector next to the headlight due to the lock being visible and easily accessible.

SUMMARY OF THE UTILITY MODEL

Such characteristics promote greater ease of installation and maintenance, when compared to prior art documents.

A characteristic of the utility model is a constructive arrangement in electrical connection applied to a vehicle headlight that provides a housing equipped with internal projections allowing the positioning of the electronic board and screw to fix the connector.

A characteristic of the utility model is a constructive arrangement in electrical connection applied to a vehicle headlight that provides a housing having a posterior projection that allows the fixation and positioning of the connector.

A characteristic of the utility model is a constructive arrangement in electrical connection applied to a vehicle headlight that provides for the fixing of the connector, positioning in parallel to the structure of the headlight housing.

A characteristic of the utility model is a constructive arrangement in electrical connection applied to a vehicle headlight that provides a connector allowing it to be arranged in parallel to the rear of the headlight, reducing the total height even when the connector is mounted.

A characteristic of the utility model is a constructive arrangement in electrical connection applied to a vehicle headlight that provides a connector allowing the use of market standard connectors which are easy to replace.

DETAILED DESCRIPTION OF THE UTILITY MODEL

Figure 1:
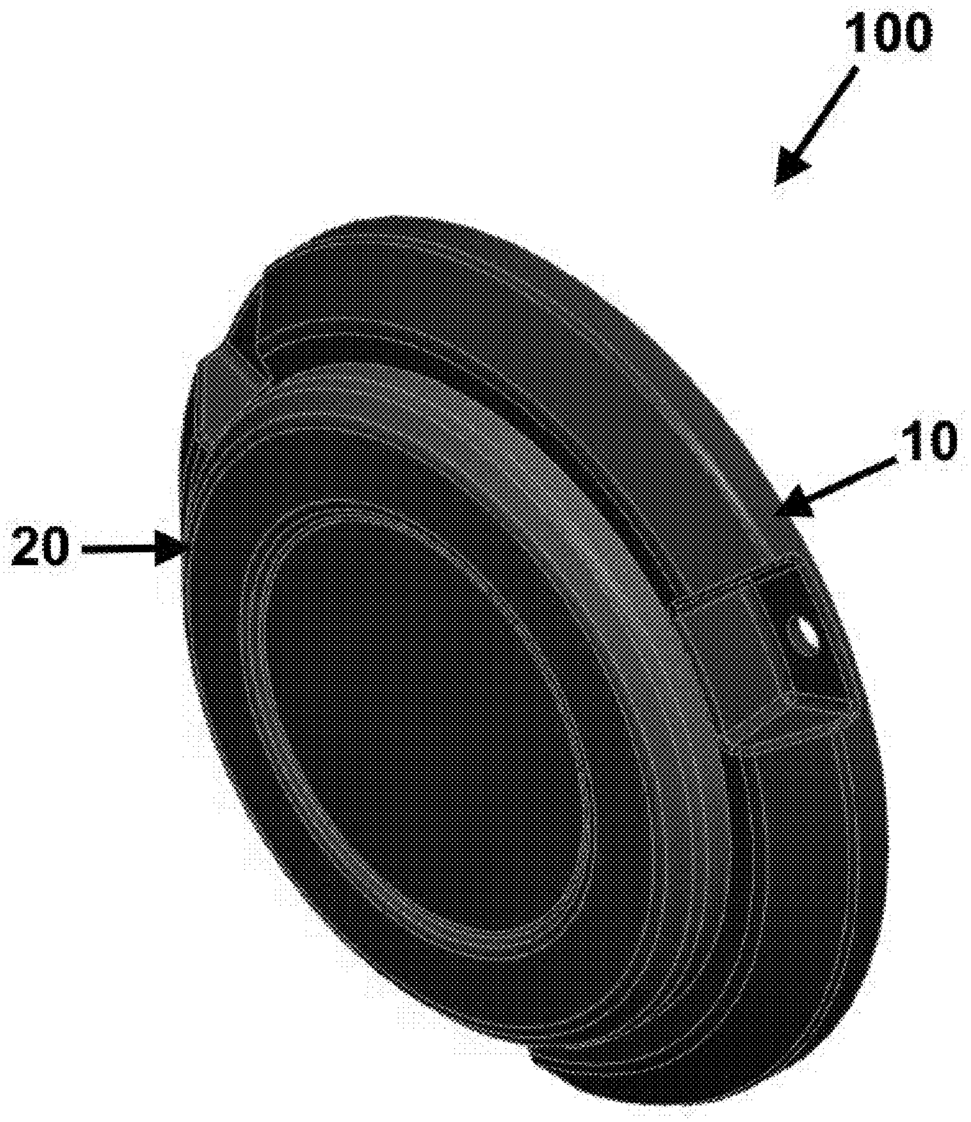
FIG. 1 shows the perspective view of the headlight with the parallel connector.
Figure 2:
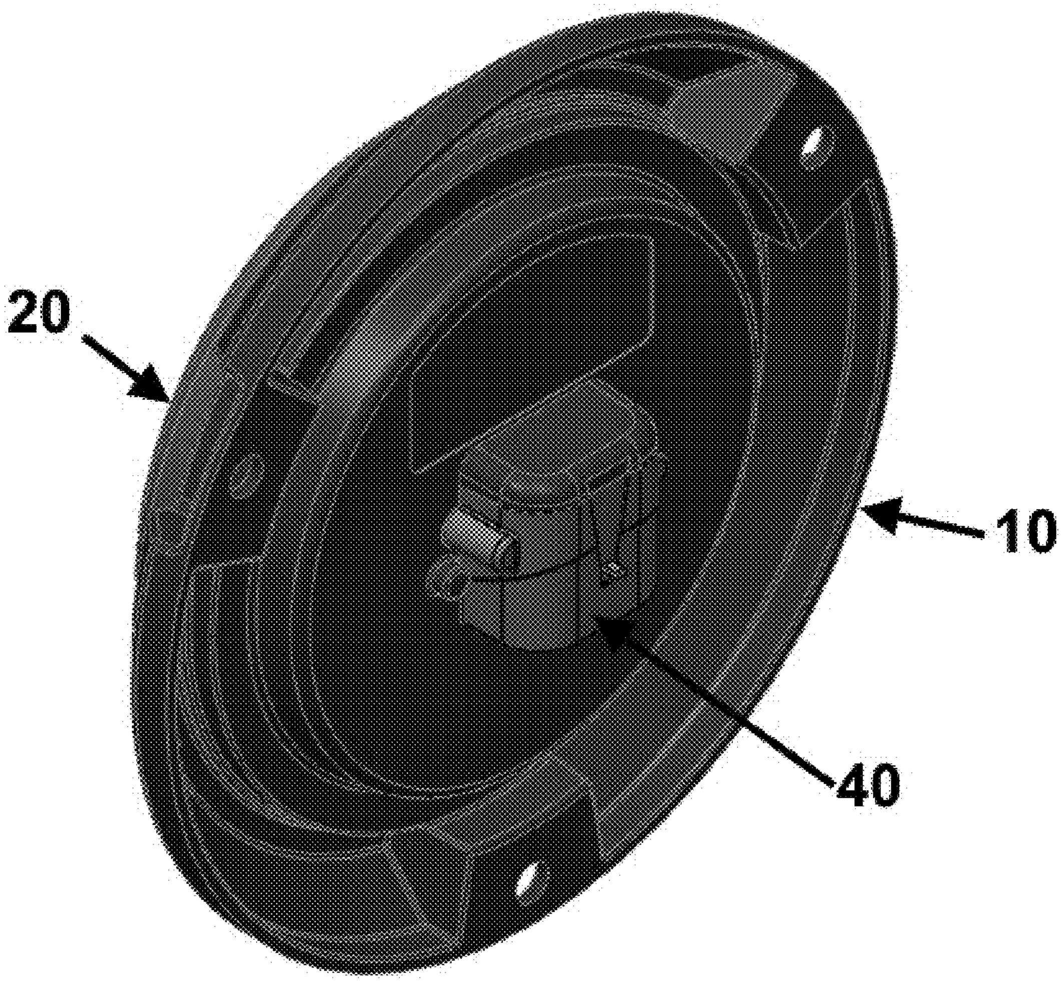
FIG. 2 shows the rear perspective view of the headlight with the parallel connector.
Figure 3:
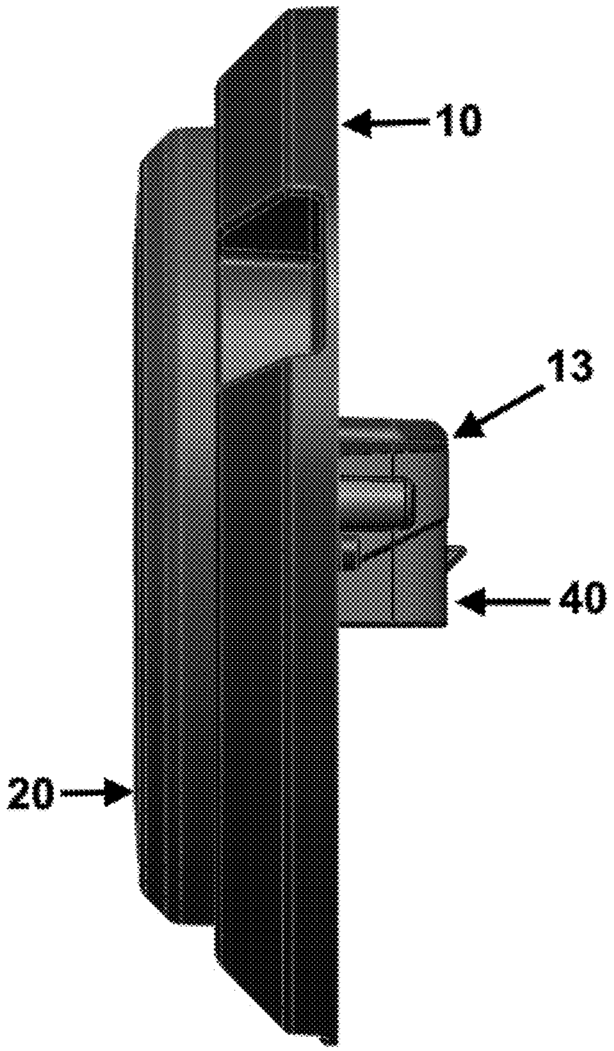
FIG. 3 shows the side view of the headlight with the parallel connector.
Figure 4:
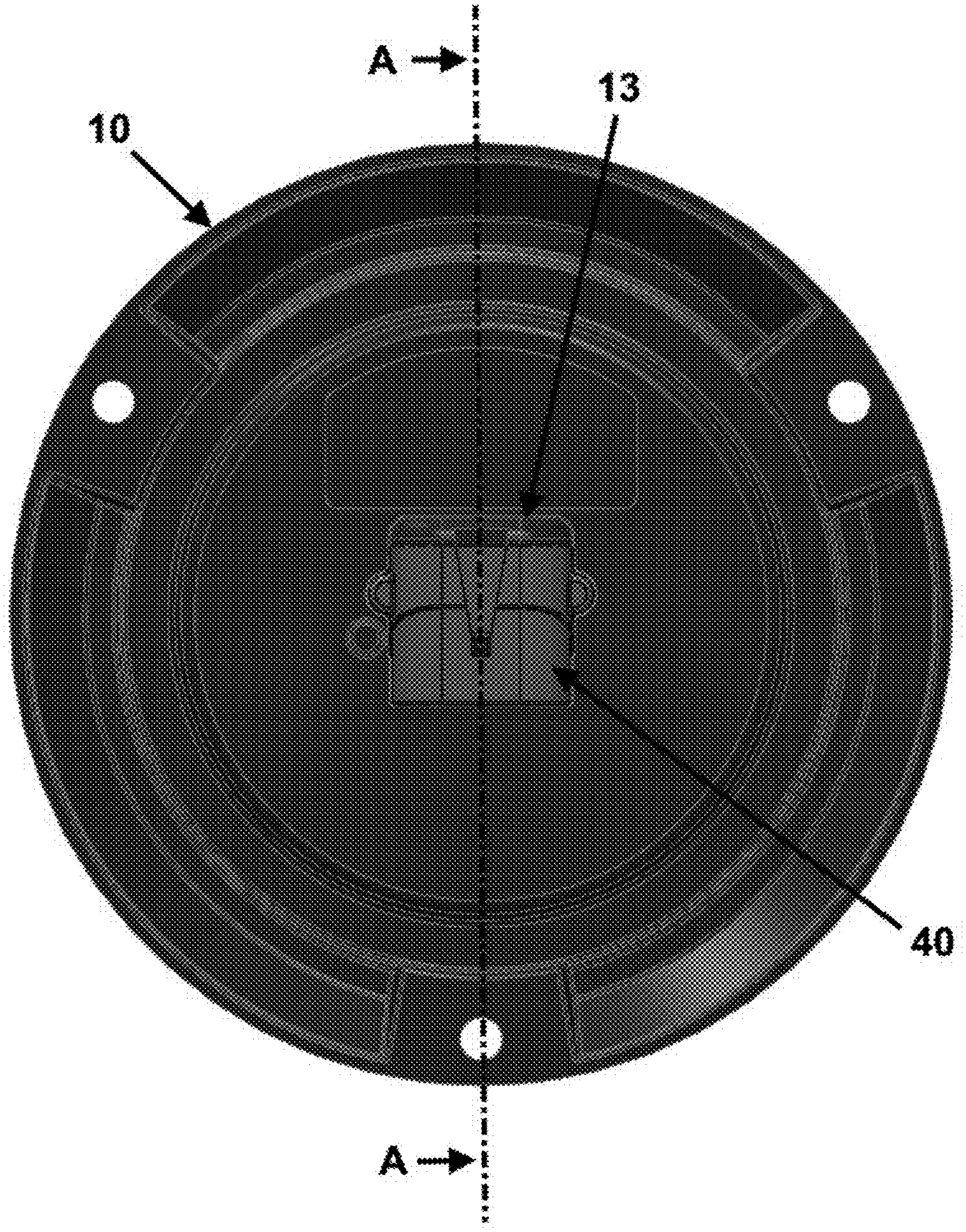
FIG. 4 shows the rear view of the headlight with the parallel connector.
Figure 5:
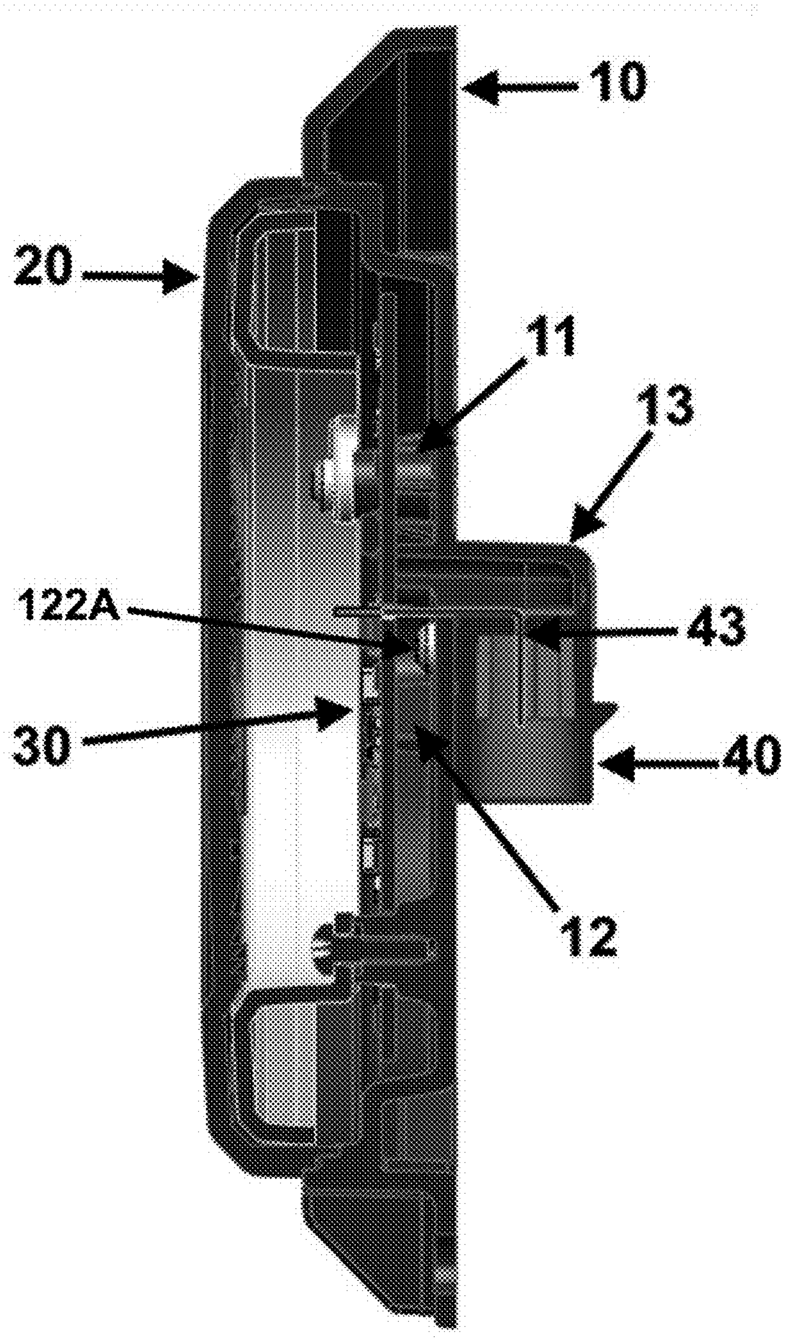
FIG. 5 shows the side sectional view of the headlight with the parallel connector.
Figure 6:
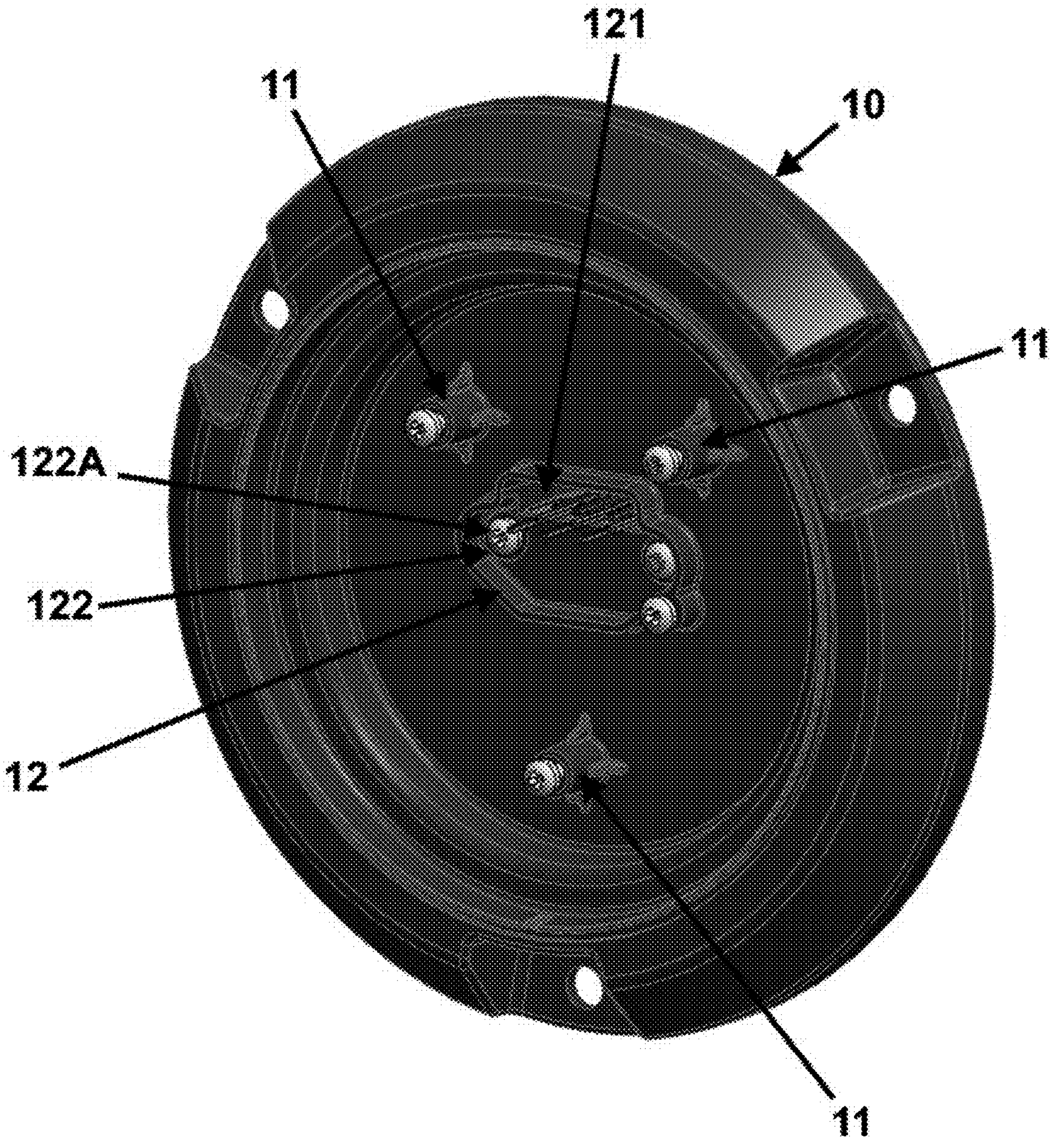
FIG. 6 shows a perspective view of the headlight housing with the parallel connector.
Figure 7:
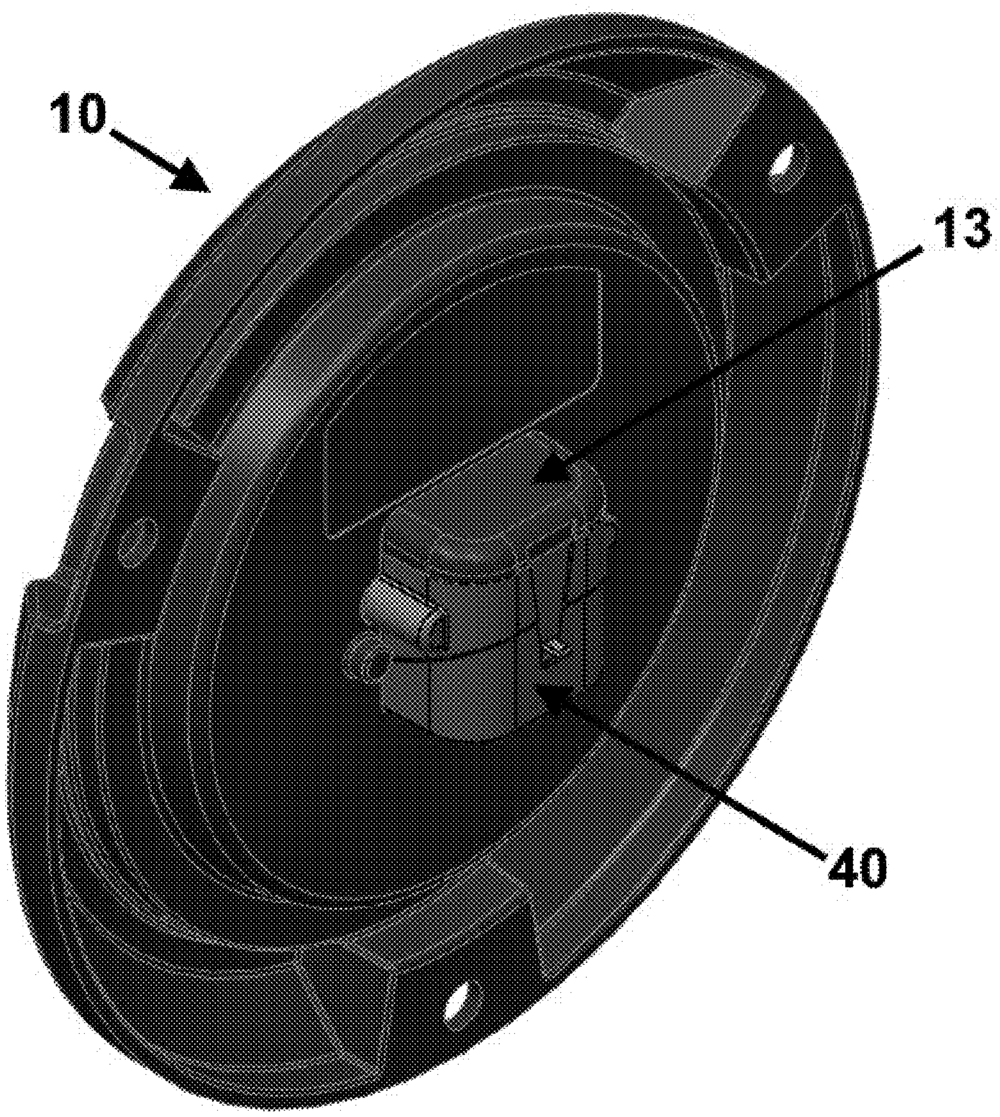
FIG. 7 shows the rear perspective view of the headlight housing with the parallel connector.
Figure 8:
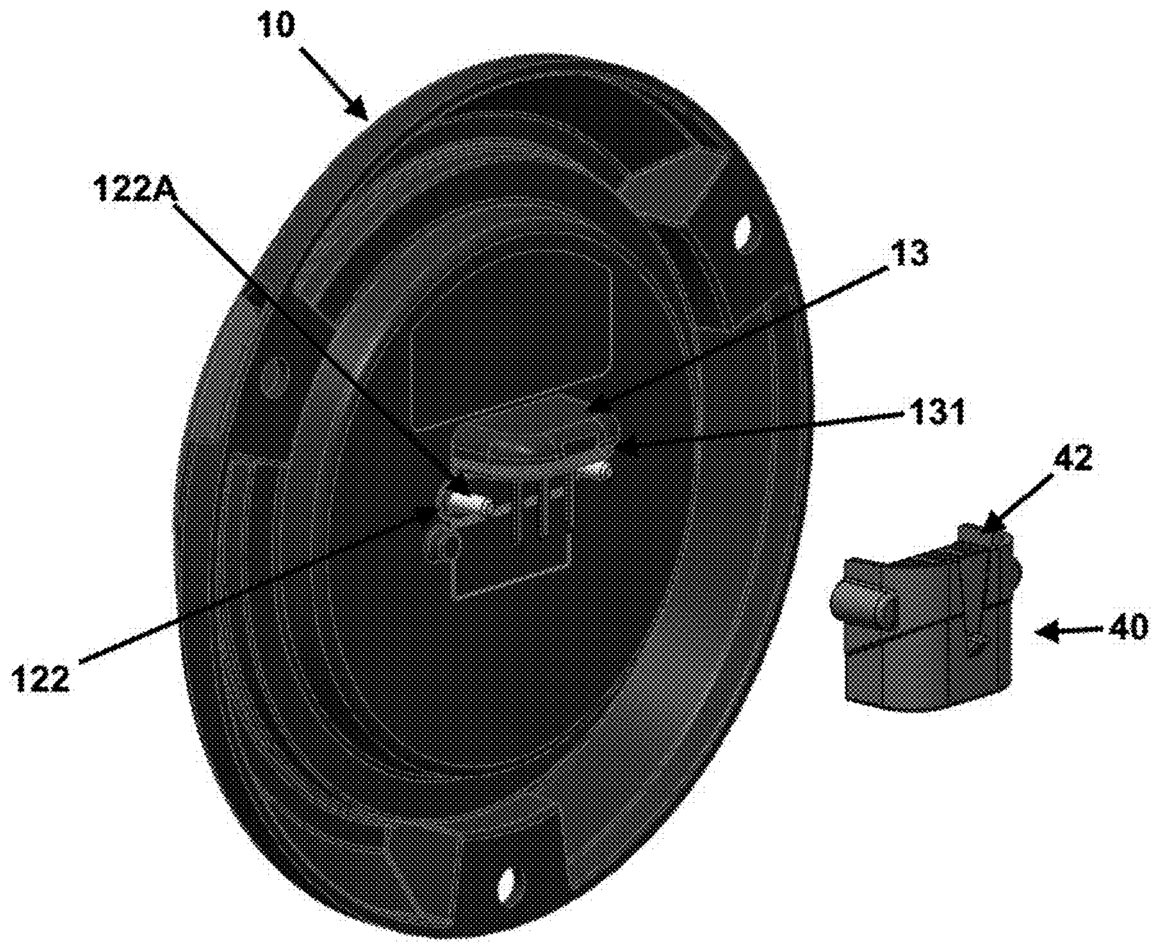
FIG. 8 shows the rear exploded perspective view of the headlight housing with the parallel connector.
Figure 9:
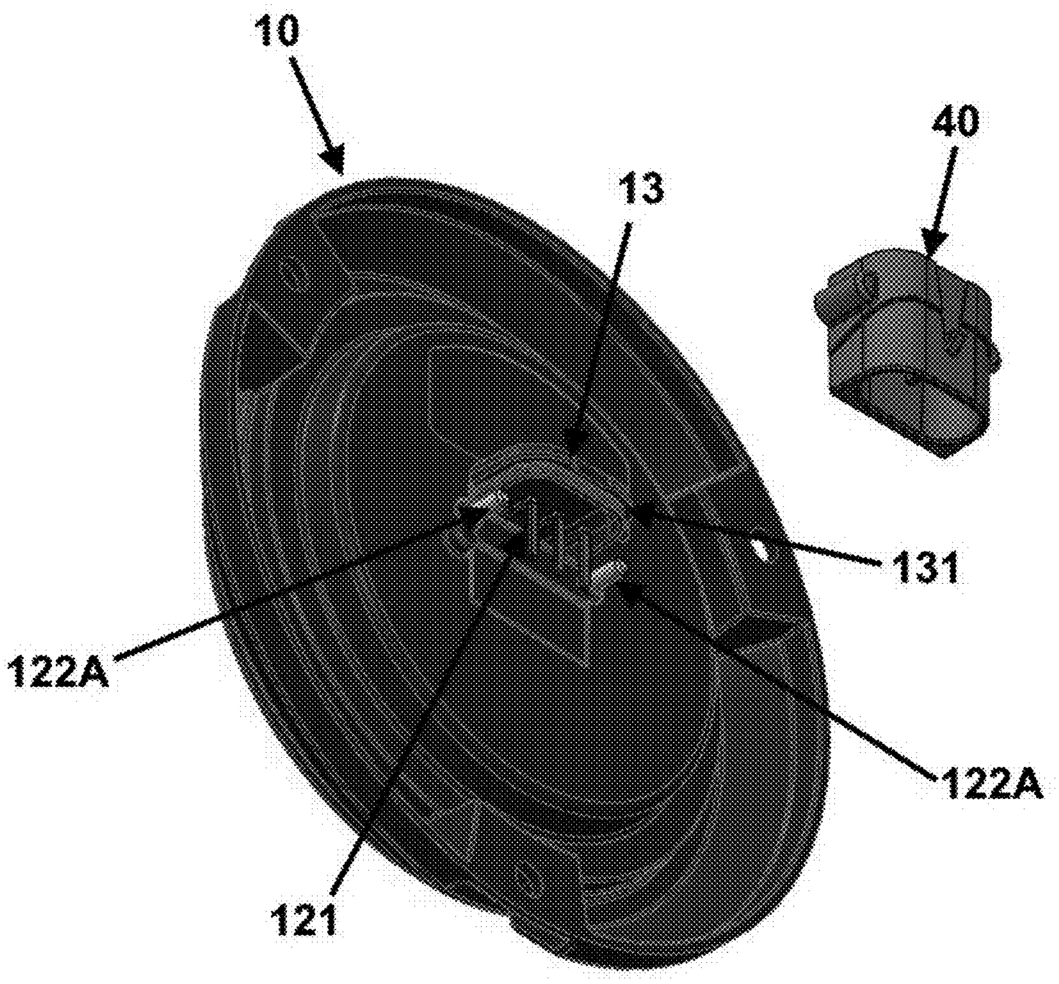
FIG. 9 shows the rear exploded bottom perspective view of the headlight housing with the parallel connector.
Figure 10:
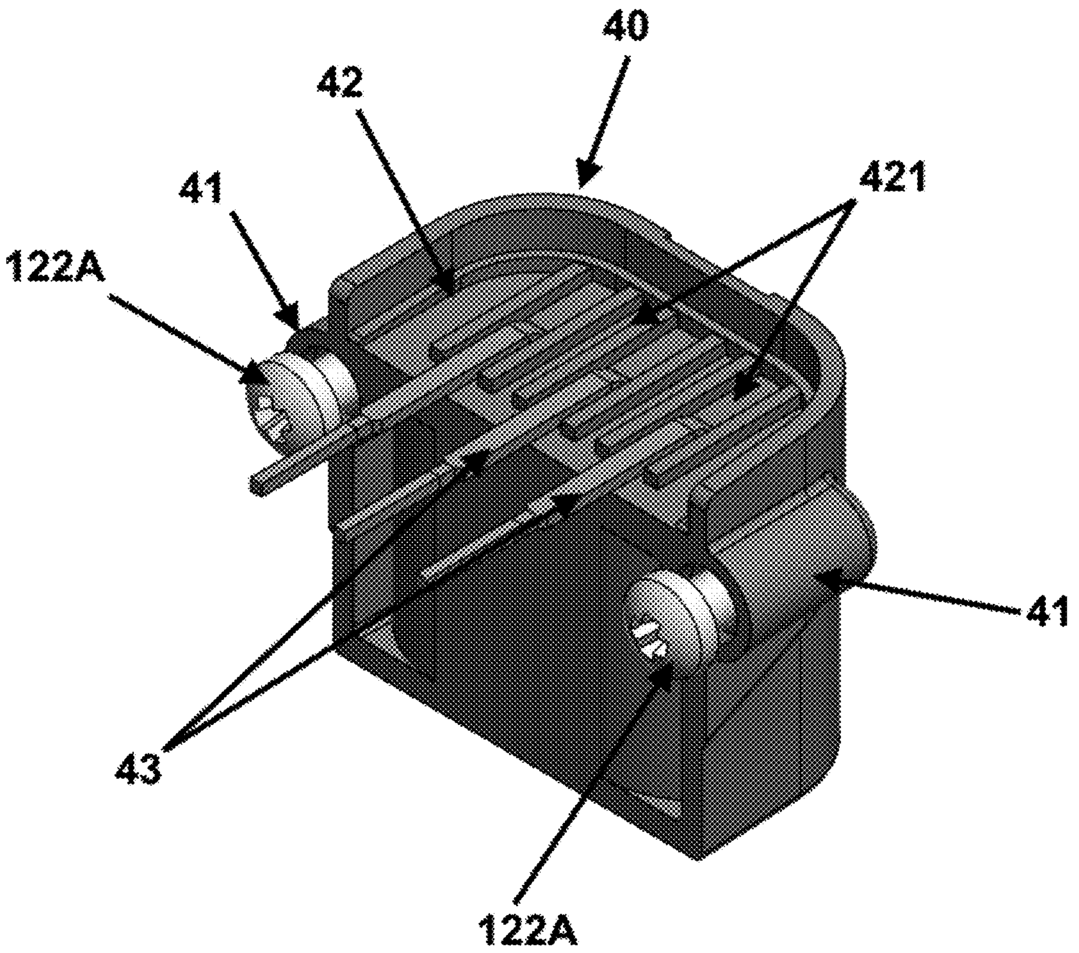
FIG. 10 shows the perspective view of the parallel connector.
Figure 11:
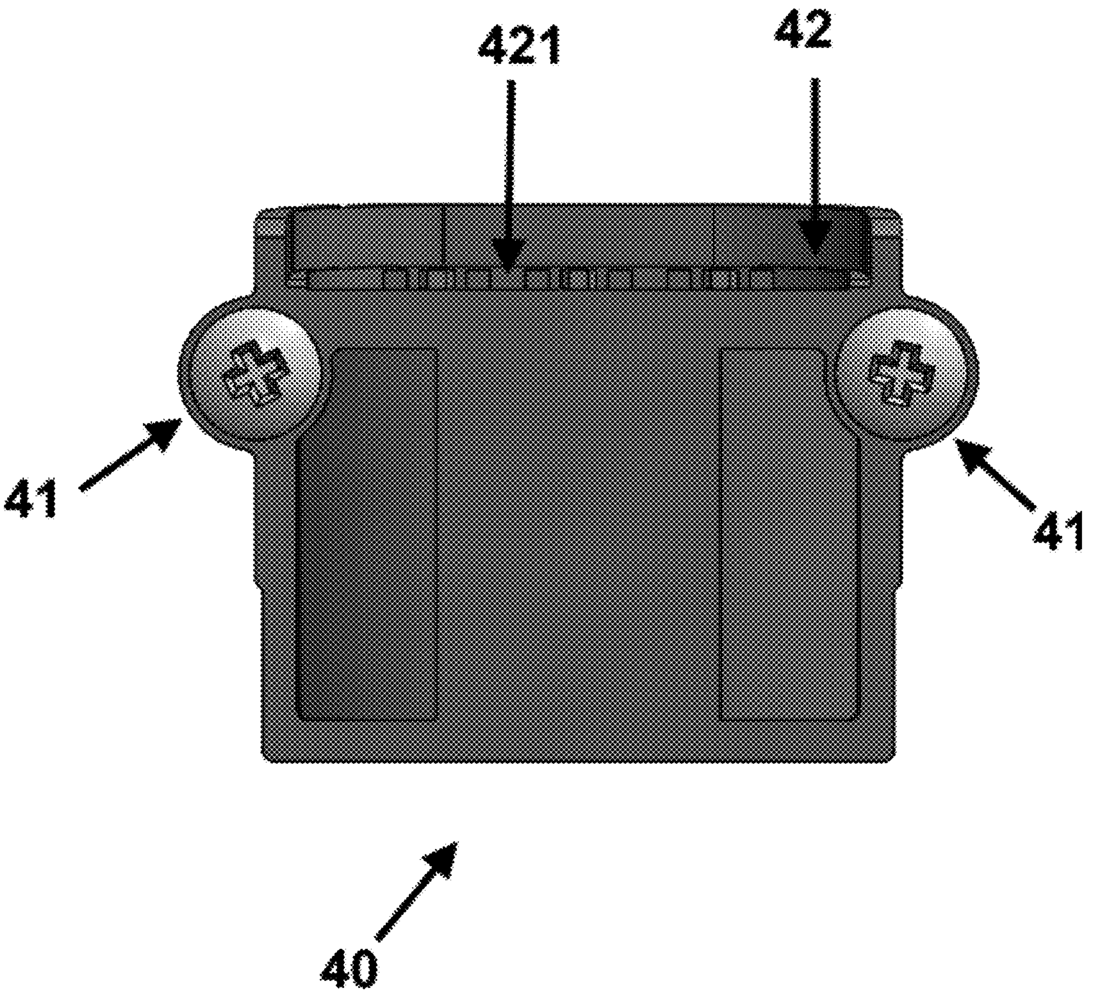
FIG. 11 shows the front view of the connector.
Figure 12:
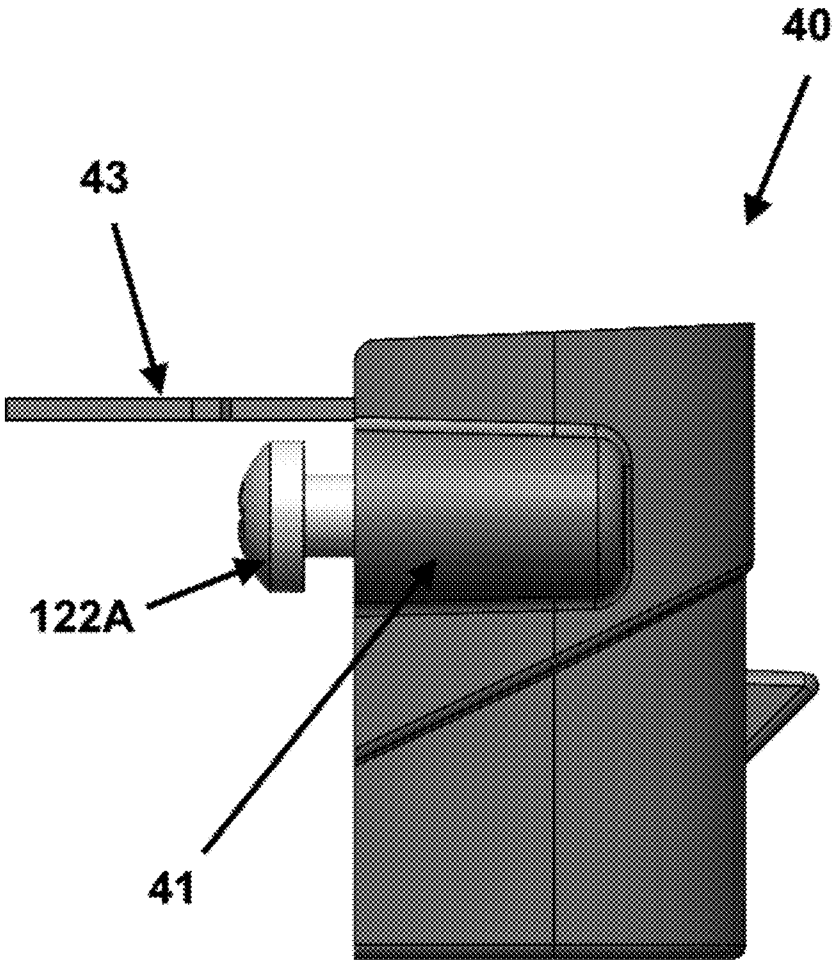
FIG. 12 shows the side view of the connector.
Figure 13:
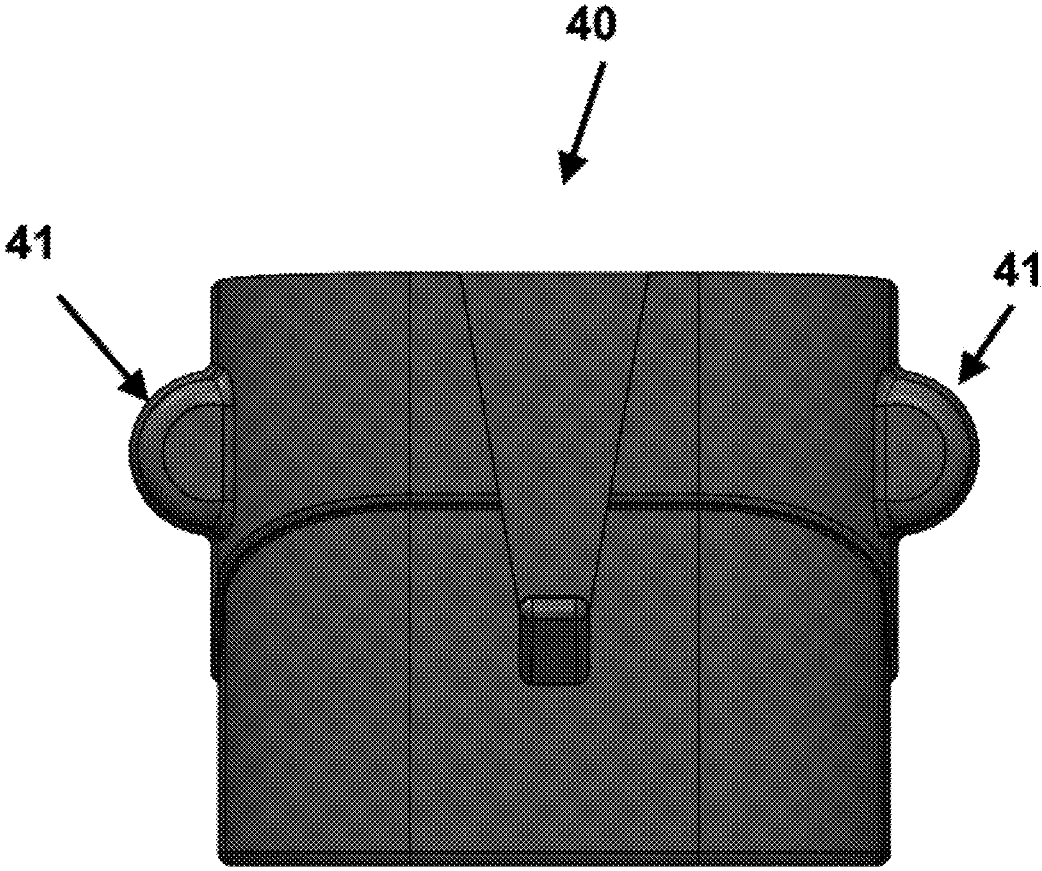
FIG. 13 shows the rear view of the connector.
Figure 14:
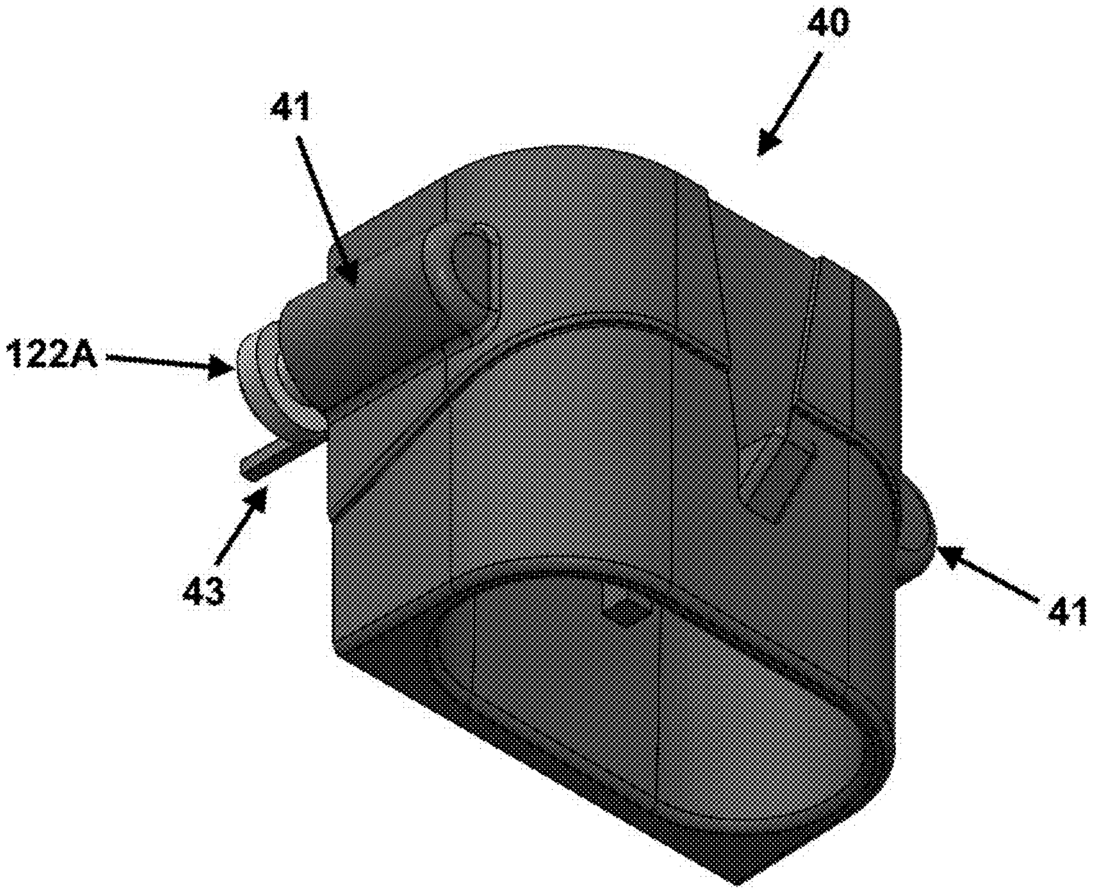
FIG. 14 shows the bottom perspective view of the parallel connector.
Figure 15:
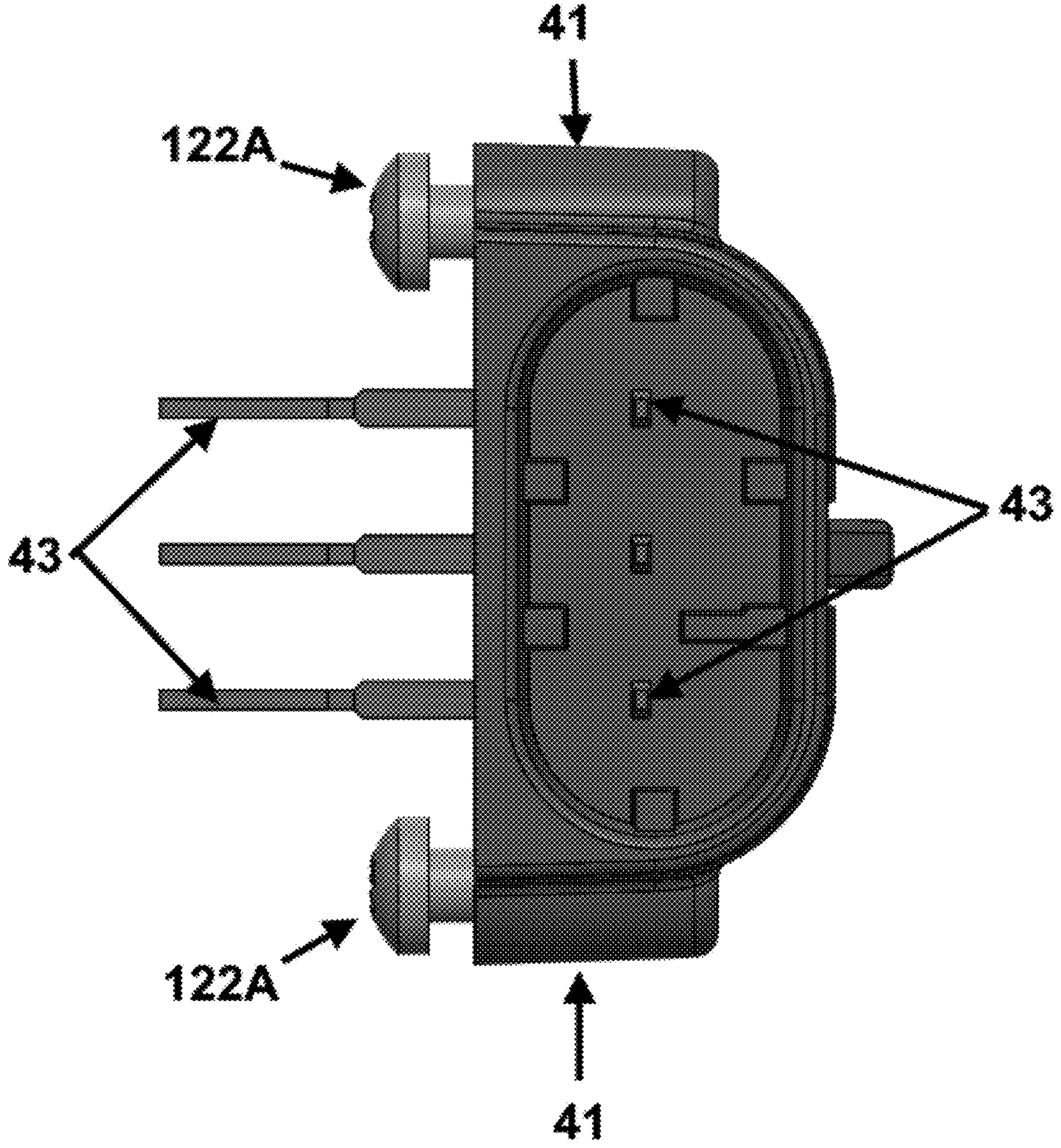
FIG. 15 shows the bottom view of the connector.

The constructive arrangement in electrical connection applied to a vehicle headlight, object of the present utility model, comprises a headlight (100) equipped with a housing (10), lens (20) and electronic board (30) with the LED lighting set.

The housing (10) is internally equipped with projections (11) for positioning and fixing the electronic board (30) using a screw and in the medial portion it has a projection (12) equipped with an opening (121) that allows positioning and passage in the electrical connections between the board (30) and the connector.

The projection (12) is equipped with holes (122) allowing the positioning of the screws (122A) for fixing next to the connector (40).

On the outer rear face of the housing (10) is arranged a projection (13) positioned with the opening (121) that allows the positioning and fixing of the connector (40).

The connector (40) is equipped with side projections with a hole (41) that allow the positioning of the screws (122A) to fix the connector to the housing (10). In the upper portion, the connector (10) is equipped with a bas-relief (42) equipped with a set of grooves (421) that allows the positioning of the electrical terminals (43) that connect to the electronic board (30), said bas-relief (42) allowing the connection of the connector (40) to the projection (13) of the housing (10).

The projection (13) is equipped with a groove (131) that allows positioning next to the bas-relief (42).

The projection (13) is equipped with a groove (131) that allows positioning next to the bas-relief (42).

This embodiment allows the connector (40) to be mounted on the housing (10) using screws (122A), with the electrical terminal (43) pre-assembled on the connector (40).

The connector (40), when connected to the housing (10), receives the application of a liquid resin to seal the assembly.

The headlight connector (40) and housing (10) have a small channel, called a mechanical labyrinth, with a male and female fitting that deforms when the screws (122A) are tightened, so that they prevent the liquid resin from leaking through the connector (40) until it is cured (solidified).

Figure 16:
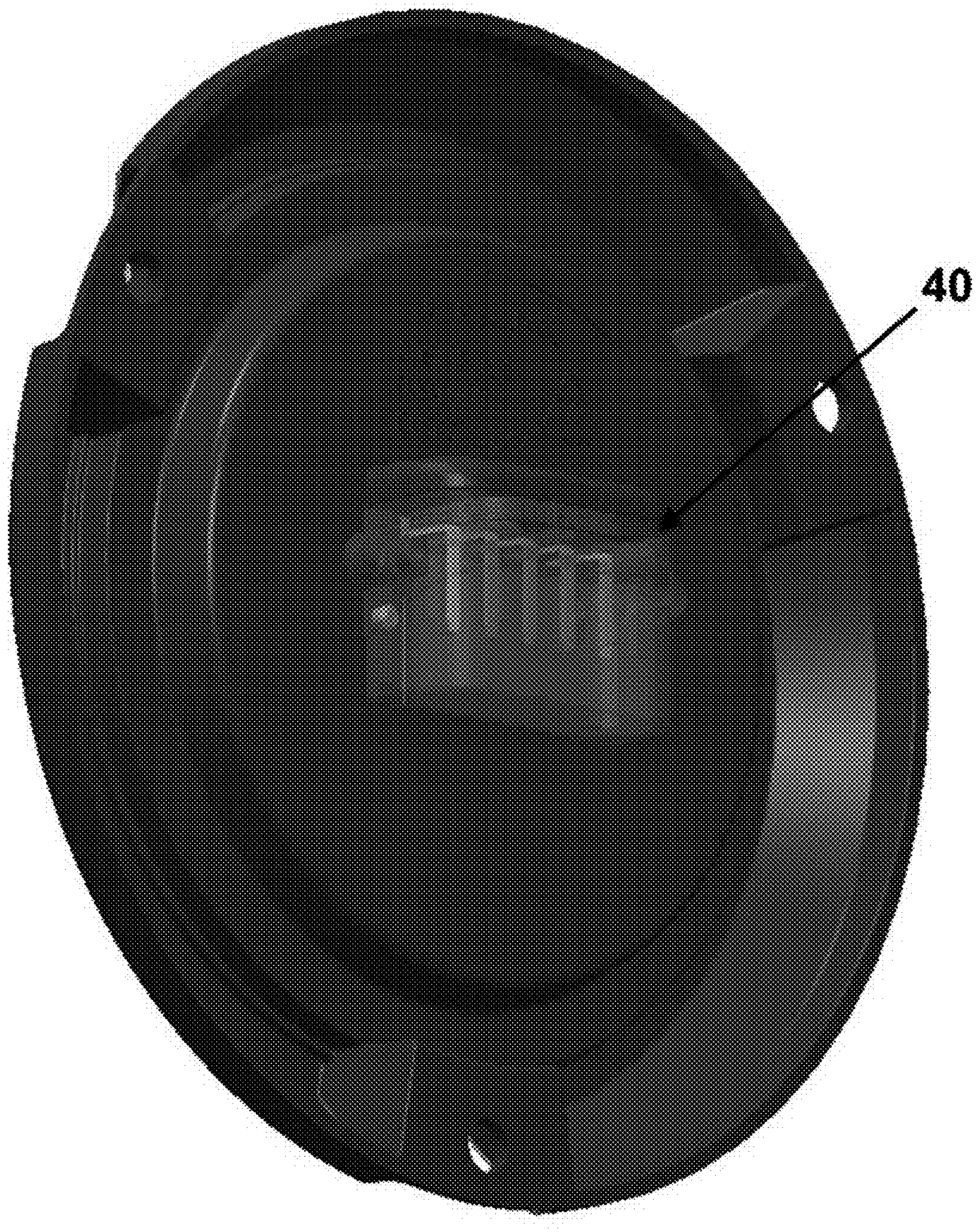
FIG. 16 shows the rear perspective view with the connector in transparency, demonstrating the 5-way connection.
Figure 17:
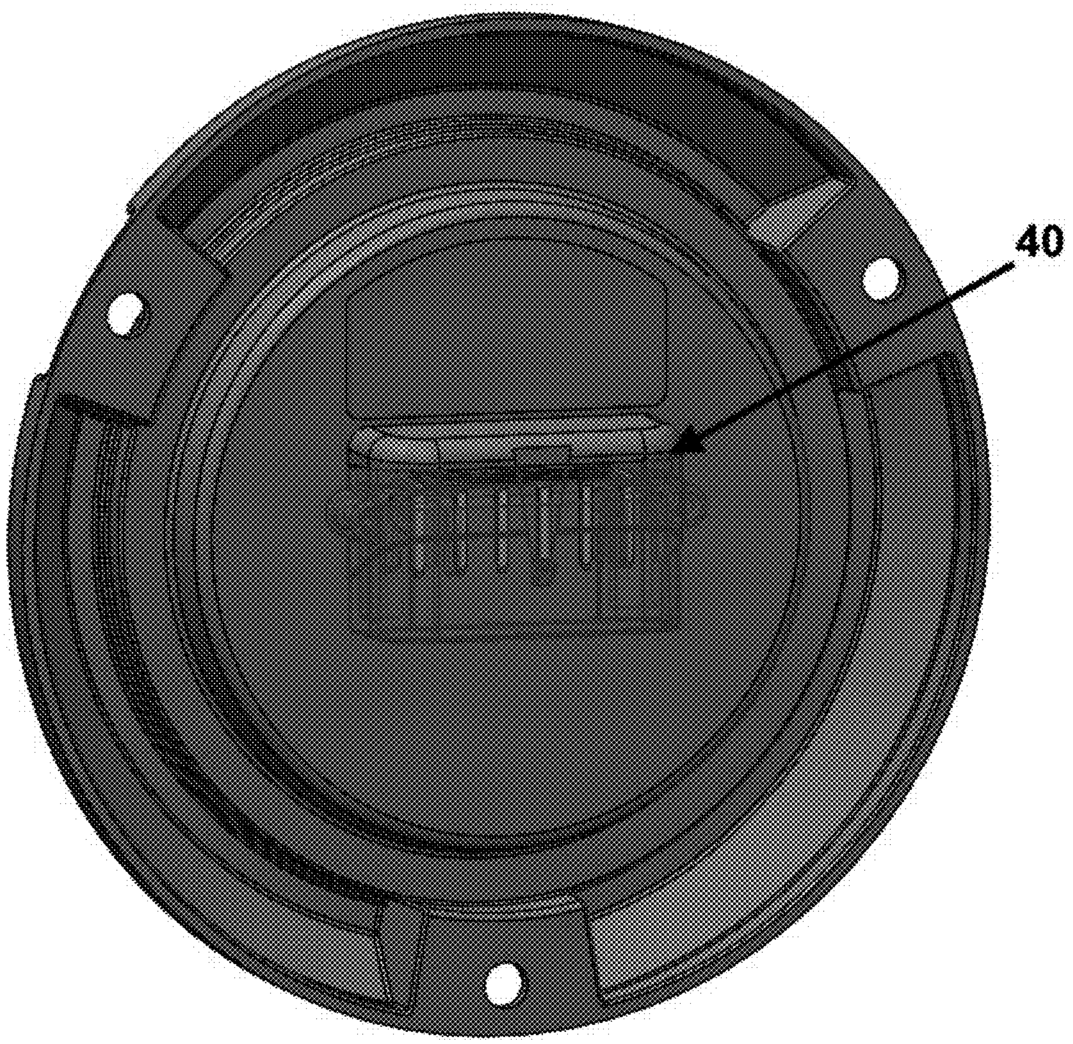
FIG. 17 shows the rear perspective view with the connector in transparency, demonstrating the 7-way connection.

The connector (40) can have different shapes varying depending on the model of the counterpart and can also have a different number of terminals, allowing the electrical connection of headlights with different amounts of functions. FIGS. 16 and 17 show the 5- and 6-ways connector (40).

The invention claimed is:

1. An electrical connection applied in a vehicle headlight, comprising the vehicle headlight equipped with a housing, a lens and an electronic board with an LED lighting set, wherein the housing is internally equipped with one or more positioning projections equipped with at least one opening configured to allow positioning of one or more-screws for fixing with a parallel connector;

the parallel connector equipped with one or more side projections equipped with a hole that allows positioning with the one or more screws such that the parallel connector is positioned on a rear portion of the housing with the one or more positioning projections, and when positioned, said parallel connector has at least one pre-assembled electrical terminal being positioned parallel to a rear face of the housing.

2. The electrical connection applied in the vehicle headlight, according to claim 1, further comprising one or more fixing projections having one or more fixing holes to allow positioning and fixing of the electronic board using one or more screws.

3. The electrical connection applied to the vehicle headlight, according to claim 1, further comprising at least one groove projection equipped with a groove that allows positioning next to a bas-relief.

4. The electrical connection applied in the vehicle headlight, according to claim 1, wherein the parallel connector is equipped with one or more side projections with one or more holes that allow the positioning of the one or more screws to fix the parallel connector to the housing.

5. The electrical connection applied to the vehicle headlight, according to claim 1, wherein the parallel connector is equipped with a bas-relief having a set of grooves that allows positioning of electrical terminals that connect to the electronic board.

6. The electrical connection applied to the vehicle headlight, according to claim 1, further comprising a bas-relief that allows a connection of the parallel connector to a groove projection of the housing.

7. The electrical connection applied in the vehicle headlight, according to claim 1, wherein the parallel connector, when connected to the housing, receives an application of a liquid resin to seal the assembly.

* * * * *